March 19, 1935.  W. KNOCHENHAUER  1,994,915
INTERNAL COMBUSTION ENGINE
Filed Aug. 12, 1931  3 Sheets-Sheet 3

Inventor:

Patented Mar. 19, 1935

1,994,915

UNITED STATES PATENT OFFICE 1,994,915

INTERNAL COMBUSTION ENGINE

Wolfgang Knochenhauer, Wernigerode, Germany

Application August 12, 1931, Serial No. 556,593
In Germany August 13, 1930

1 Claim. (Cl. 123—72)

This invention relates to a new arrangement of and improvements in internal combustion engines, particularly of the type described in American Patent No. 1,767,932.

In engines of this class the compression space of the compression cylinder supplying the compressed air for combustion faces the combustion space of the working cylinder and the compressed air for combustion is compressed in two stages, the first stage being arranged in the working cylinder on the side of the working piston removed from the combustion space while the second stage is disposed in the compression cylinder constructed as high pressure stage.

According to the present invention, the compressor cylinders are tilted outwardly about 30° in the direction of rotation, resulting in lower constructional height and the formation of larger wall surfaces for the accommodation of cooling ribs. A further advantage derived from the invention is that the crank pins driving the compressor pistons and the main bend form an angle of 180° less 50° injection angle plus 30° inclination of the compressor cylinders relative to the main shaft or 160° whereby a better balancing of the masses is attained. In multiple cylinder engines, a considerable advantage is also afforded in that two working pistons of a cylinder group composed of two units are connected to a single driving rod by means of a cross-member, so that the crank gear is considerably simplified as to the number of cylinders and, above all a system of rods guide impeding the air cooling, are avoided in that merely the cylinder sides facing one another surround a driving rod. Finally, another important feature consists in that the control members are considerably simplified by the elimination of a separate cam or control shaft required or a transmission gearing such as hitherto required for driving the cam drum on the crank shaft for example in star-connected motors.

An embodiment of the invention is illustrated by way of example in the accompanying drawings in which Fig. 1 shows in partial longitudinal section an internal combustion engine provided with air cooling.

In a crank case $b$ two short compression cylinders $a$ are inserted, the pistons $c$ of which are connected to the crank shaft $d$ by means of crank pins $d^2$. Valve crests $e$ carry the working cylinders $f$ standing thereon and communicating with the compression cylinders $a$ by means of an outer channel $n$. In these cylinders $a$ the air compressed by the working piston $g$ is again compressed and is finally forced therefrom through the controlled compressed air valve 14 into the combustion chamber $o$ of the working cylinder. The outwardly extending piston rods $h$ are mounted in the working pistons and packed by stuffing boxes $j$, arranged in the covers $i$. The piston rods $h$ terminate in a cross member $k$.

Figure 2:
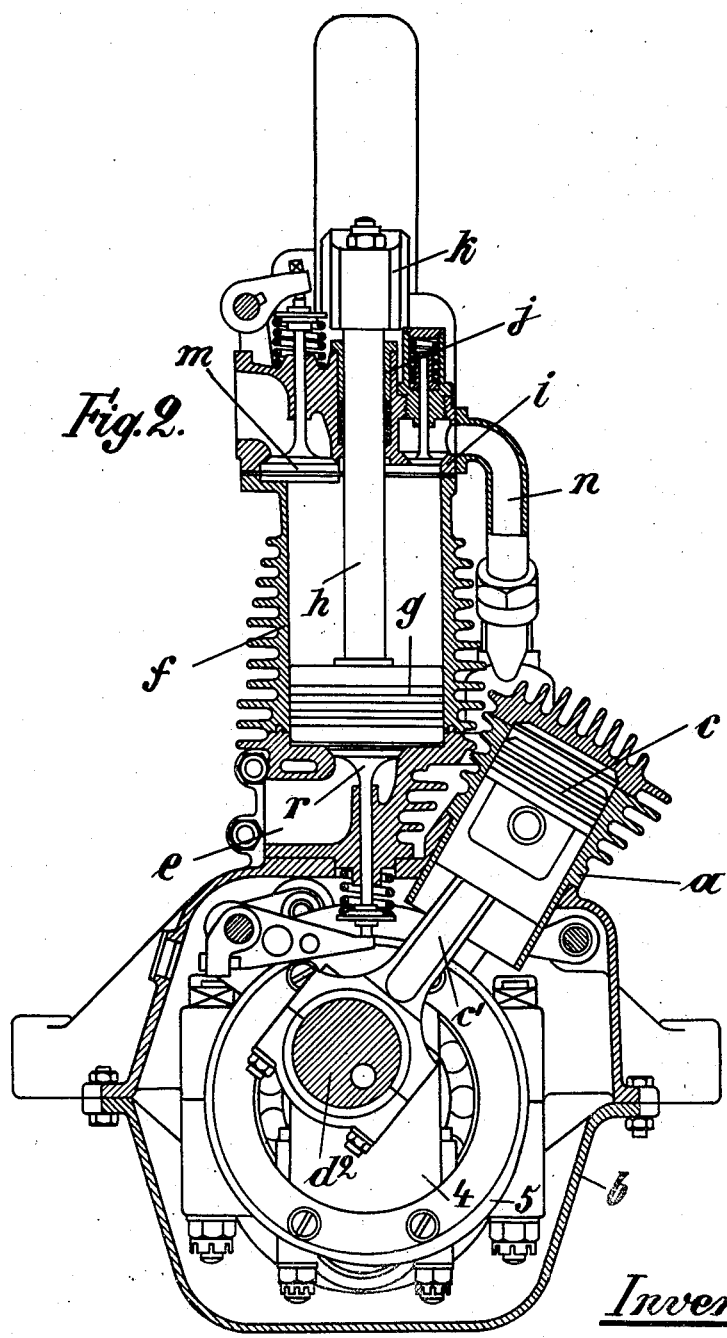
Fig. 2 is a cross section of Fig. 1.
Figure 3:
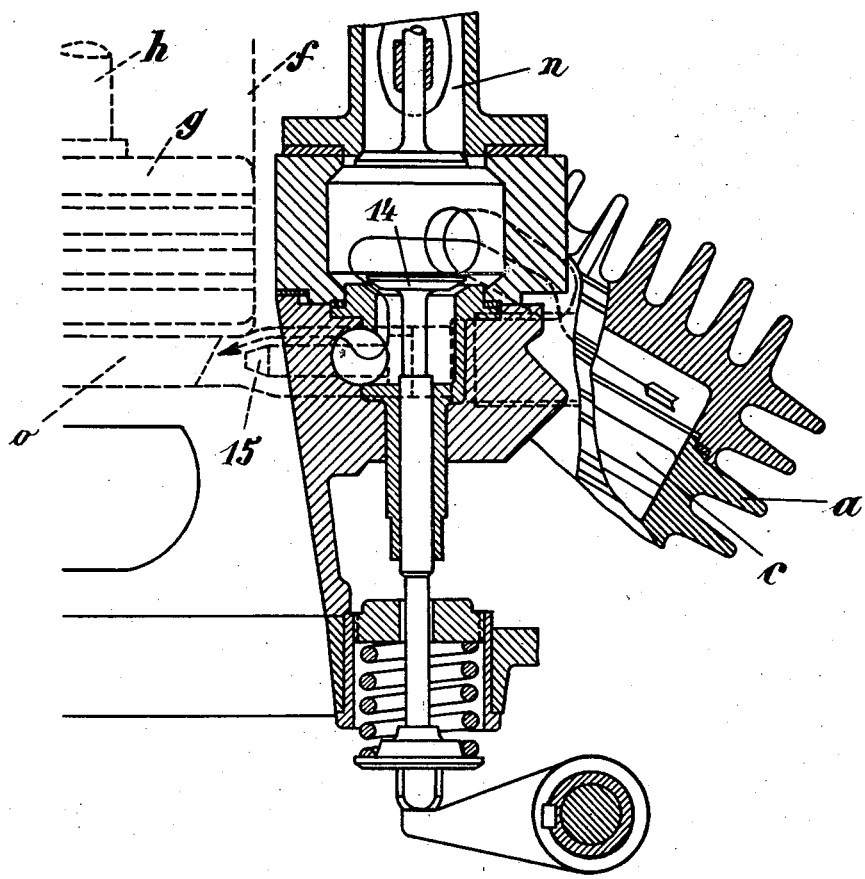
Fig. 3 shows a part section through the middle of the engine transversely to the axis showing part of the compression cylinder projecting on the right.

Regarded from the direction of the crank shaft, the working cylinders are arranged one behind the other, the compression cylinders $a$, situated also one behind the other, are outwardly inclined laterally by about 30° in the direction of rotation so that a lower constructional height and the production of greater wall surfaces for the accommodation of cooling ribs is obtained. The cross member $k$ connecting the two piston rods $h$ is provided on its under side with journal bearings 2 for the hollow bolt 3, from which the driving rod $l$ is suspended, and which rod is connected to the crank pin $d'$. On both sides of this main pin $d'$ two smaller pins $d^2$ are provided for the two connecting rods $c'$ of the compressor pistons $c$. The crank shaft $d$ is journaled in roller bearing $p$. The cam or control discs for the controlled valves are disposed on the crank shaft $d$. The ring 5 provided with corresponding cams and keyed on a main crank arm 4 serves for controlling the exhaust valve $r$. The disc shaped crank arm 6, situated beside the rear crank bearing $p$, carries a control ring 7, which actuates a fuel pump and a compressed air valve 14, Fig. 3, said pump supplying a nozzle which injects fuel into the air. The fresh air suction valves $m$ (Fig. 2) are controlled by a cam disc 8, keyed on the other side of the bearing $p$. A cam disc 9 is also keyed on the end of the crank shaft and serves for driving the fuel pump 10, which is connected with a fuel pressure collector 11. Between the two discs 8 and 9 a helical wheel 12 is keyed on the crank shaft $d$, and drives the lubricating oil pump 13.

Figure 1:
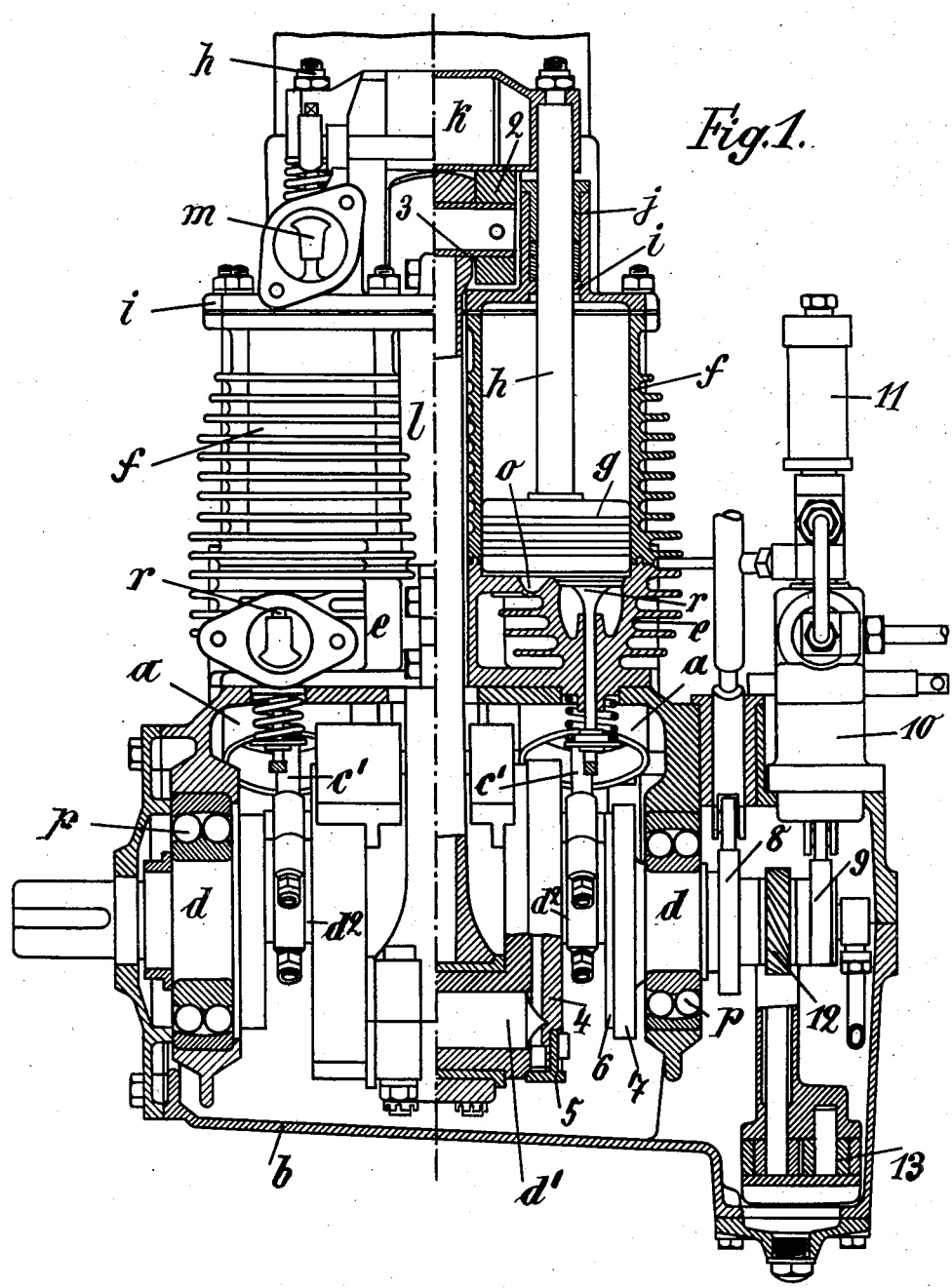

As shown in Fig. 1, the pistons $g$ rest almost on the base of the cylinder $f$, when in the lowest position. The injection of the compressed air-fuel mixture is effected through a duct $o$, formed in the base of the cylinders $f$.

I claim:

In an internal combustion engine, working cylinder groups composed of two units, working pistons in each group, driving rods extending between said cylinders, each driving rod adapted to serve two working cylinders, a cross member connecting each driving rod with two working pistons, and compressor cylinders laterally tilted substantially 30° relative to said working cylinder in the direction of rotation, adapted to compress the air for combustion and supply same to said working cylinders.

WOLFGANG KNOCHENHAUER.